(12) United States Patent
Hwang et al.

(10) Patent No.: US 7,593,073 B2
(45) Date of Patent: Sep. 22, 2009

(54) OPTICAL MEMBER, METHOD OF MANUFACTURING THE SAME AND DISPLAY DEVICE HAVING THE SAME

(75) Inventors: In-Sun Hwang, Suwon-si (KR); Sang-Yu Lee, Yongin-si (KR); Hae-Il Park, Seoul (KR); Jin-Seob Byun, Seoul (KR); Hyoung-Joo Kim, Uiwang-si (KR)

(73) Assignee: Samsung Electronics Co. Ltd., Suwon-Si, Gyeonggi-do (KR)

( * ) Notice: Subject to any disclaimer, the term of this patent is extended or adjusted under 35 U.S.C. 154(b) by 657 days.

(21) Appl. No.: 11/221,448

(22) Filed: Sep. 7, 2005

(65) Prior Publication Data

US 2006/0232732 A1    Oct. 19, 2006

(30) Foreign Application Priority Data

Apr. 13, 2005    (KR) .............. 10-2005-0030580

(51) Int. Cl.
*G02F 1/1333* (2006.01)
*G02F 1/1335* (2006.01)

(52) U.S. Cl. .................. 349/84; 349/115; 349/98

(58) Field of Classification Search ............ 349/84, 349/115, 81, 130, 92, 96, 98
See application file for complete search history.

(56) References Cited

U.S. PATENT DOCUMENTS

| | | | |
|---|---|---|---|
| 4,678,285 A * | 7/1987 | Ohta et al. | 349/71 |
| 4,772,885 A * | 9/1988 | Uehara et al. | 349/71 |
| 6,798,469 B2 * | 9/2004 | Kimura | 349/61 |
| 6,841,803 B2 * | 1/2005 | Aizawa et al. | 257/98 |
| 7,466,374 B2 * | 12/2008 | Choo et al. | 349/69 |
| 2006/0240286 A1 * | 10/2006 | Park et al. | 428/690 |
| 2006/0244872 A1 * | 11/2006 | Kim et al. | 349/25 |

* cited by examiner

*Primary Examiner*—Mike Qi
(74) *Attorney, Agent, or Firm*—Haynes and Boone, LLP

(57) ABSTRACT

An optical member includes a first liquid crystal assembly and a second liquid crystal assembly. The first liquid crystal assembly has a liquid crystal layer aligned in a first direction. Light polarized in the first direction is reflected from the first liquid crystal assembly. The second liquid crystal assembly is positioned on the first liquid crystal assembly. The second liquid crystal assembly has a liquid crystal layer aligned in a second direction that is opposite to the first direction. Light polarized in the second direction is reflected from the second liquid crystal assembly. Therefore, an image display quality is improved.

22 Claims, 9 Drawing Sheets

OPTICAL MEMBER, METHOD OF MANUFACTURING THE SAME AND DISPLAY DEVICE HAVING THE SAME

CROSS-REFERENCE TO RELATED APPLICATION

The present application claims priority from Korean Patent Application No. 2005-30580, filed on Apr. 13, 2005, the disclosure of which is hereby incorporated herein by reference in its entirety.

BACKGROUND

1. Field of the Invention

The present invention relates to an optical member, a method of manufacturing the optical member and a display device having the optical member. More particularly, the present invention relates to an optical member capable of improving an image display quality, a method of manufacturing the optical member and a display device having the optical member.

2. Description of the Related Art

A photoluminescent liquid crystal display (PLLCD) device, in general, displays an image using an ultraviolet light or a blue light that is generated from a light source to pass through a liquid crystal layer and a fluorescent layer.

The light is partially scattered by the fluorescent layer so that about 60% to about 70% of the light is leaked. Therefore, a luminance and a resolution of the PLLCD are deteriorated, and a contrast ratio of the PLLCD is decreased.

SUMMARY

In accordance with the present invention, an optical member capable of improving an image display quality is provided.

In addition, a method of manufacturing the optical member is provided.

In addition, a display device having the optical member is provided.

An optical member in accordance with an exemplary embodiment of the present invention includes a first liquid crystal assembly and a second liquid crystal assembly. The first liquid crystal assembly has a liquid crystal layer aligned in a first direction. Light polarized in the first direction is reflected from the first liquid crystal assembly. The second liquid crystal assembly is positioned on the first liquid crystal assembly. The second liquid crystal assembly has a liquid crystal layer aligned in a second direction that is opposite to the first direction. Light polarized in the second direction is reflected from the second liquid crystal assembly.

A method of manufacturing an optical member in accordance with an exemplary embodiment of the present invention is provided as follows. A first liquid crystal assembly having a liquid crystal layer aligned in a first direction is formed such that light polarized in the first direction is reflected from the first liquid crystal assembly. The first liquid crystal assembly is combined with a second liquid crystal assembly having a liquid crystal layer aligned in a second direction that is opposite to the first direction such that light polarized in the second direction is reflected from the second liquid crystal assembly.

A display device in accordance with an exemplary embodiment of the present invention includes a light source unit and a display unit. The light source unit generates light. The display unit includes a liquid crystal layer, a fluorescent layer and an optical member. The liquid crystal layer varies a light transmittance of the light generated from the light source. The fluorescent layer generates a visible light based on the light from the light source unit. The optical member comprises a cholesteric liquid crystal transmitting light that has passed through the liquid crystal layer so that the light is irradiated onto the fluorescent layer. Light that leaks from the fluorescent layer is reflected from the optical member.

In accordance with the present invention, an optical member having improved reflectivity is provided for reflecting visible light generated by the light source unit so that the image display quality of the display device is improved.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

It should be understood that the exemplary embodiments of the present invention described below may be varied and modified in many different ways without departing from the inventive principles disclosed herein, and the scope of the present invention is therefore not limited to these particular following embodiments. Rather, these embodiments are provided so that this disclosure will be thorough and complete, and will fully convey the concept of the invention to those skilled in the art by way of example and not of limitation.

Hereinafter, the present invention will be described in detail with reference to the accompanying drawings.

Figure 1:
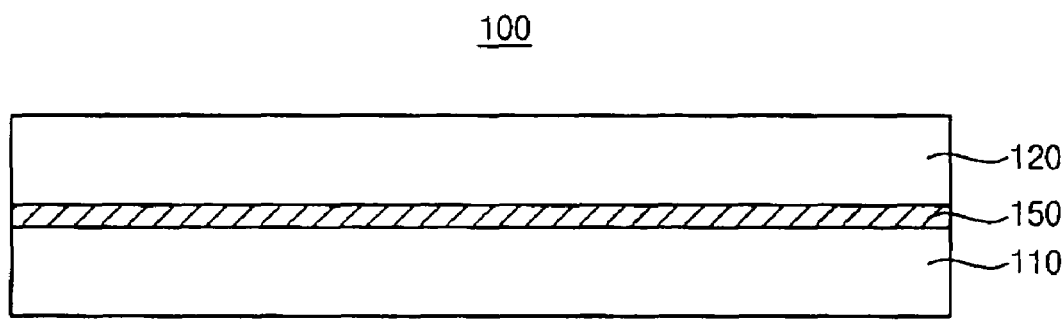
FIG. 1 is a cross-sectional view showing an optical member in accordance with an exemplary embodiment of the present invention.
Figure 2:
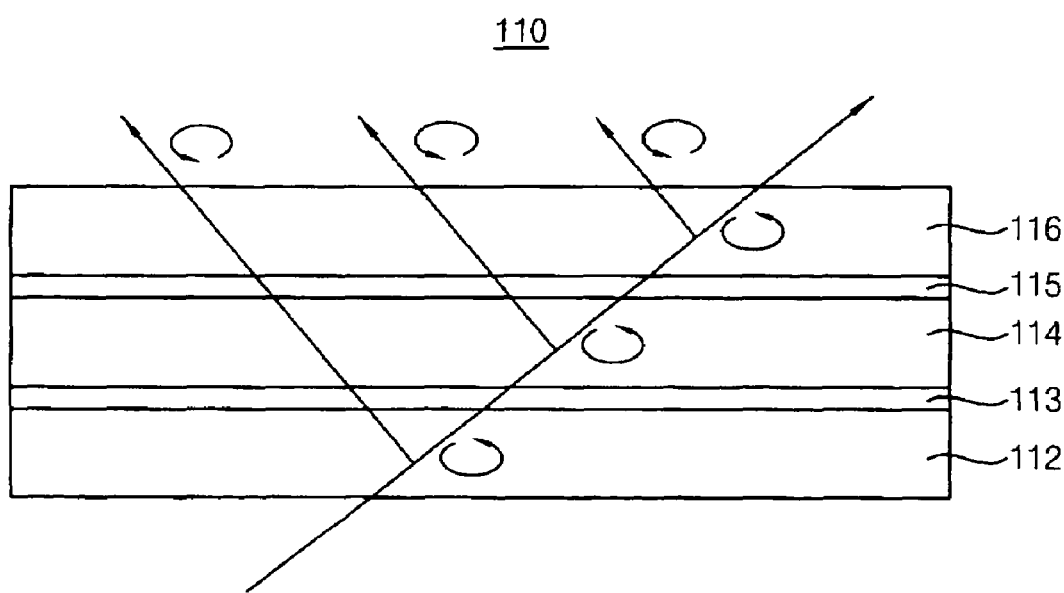
FIG. 2 is a cross-sectional view showing a first liquid crystal assembly shown in FIG. 1.
Figure 3:
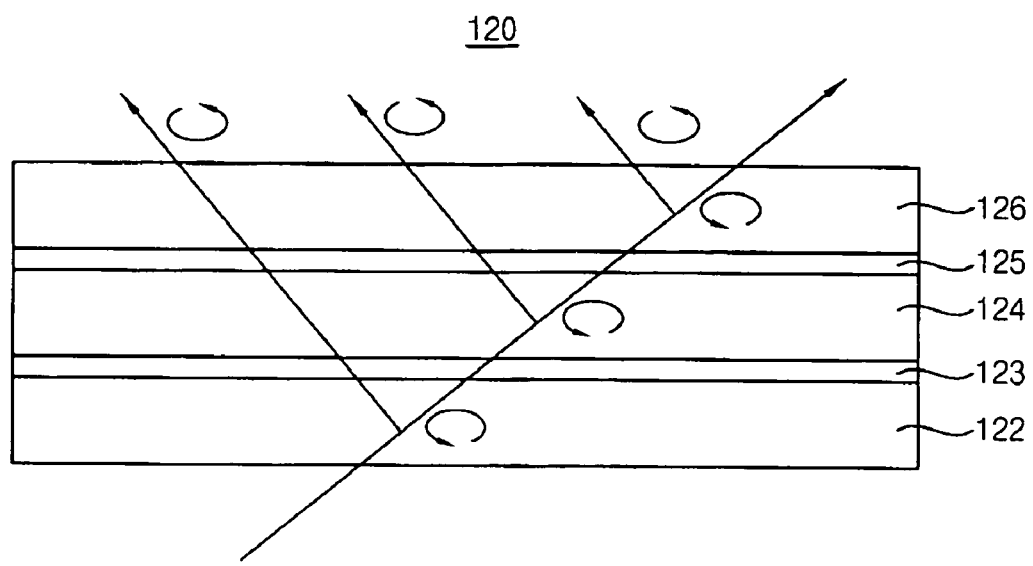
FIG. 3 is a cross-sectional view showing a second liquid crystal assembly shown in FIG. 1.

FIG. 1 is a cross-sectional view showing an optical member in accordance with an exemplary embodiment of the present invention. FIG. 2 is a cross-sectional view showing a first liquid crystal assembly shown in FIG. 1. FIG. 3 is a cross-sectional view showing a second liquid crystal assembly shown in FIG. 1.

Referring to FIGS. 1 to 3, the optical member 100 includes a first liquid crystal assembly 110 and a second liquid crystal assembly 120.

The first liquid crystal assembly 110 includes a cholesteric liquid crystal that is aligned in a first direction. The first liquid crystal assembly 110 transmits light that vibrates in a direction different from the first direction, and light that is polarized in the first direction is reflected from the first liquid crystal assembly 110.

The first liquid crystal assembly 110 includes a first liquid crystal film 112, a second liquid crystal film 114 and a third liquid crystal film 116. The first, second and third liquid crystal films 112, 114 and 116 generate a circularly polarized red light, a circularly polarized green light and a circularly polarized blue light, respectively. In this exemplary embodiment, the second liquid crystal film 114 is on the first liquid crystal film 112, and the third liquid crystal film 116 is on the second liquid crystal film 114.

A first adhesive 113 is interposed between the first and second liquid crystal films 112 and 114 so that the second liquid crystal film 114 is attached to the first liquid crystal film 112. A second adhesive 115 is interposed between the second and third liquid crystal films 114 and 116 so that the third liquid crystal film 116 is attached to the second liquid crystal film 114.

Figure 4:
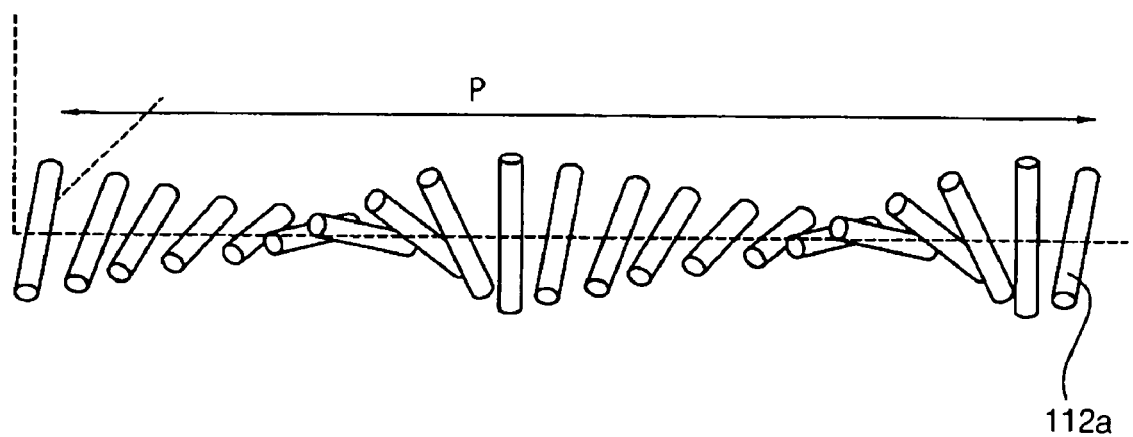
FIG. 4 is a perspective view showing a first liquid crystal film shown in FIG. 2.

FIG. 4 is a perspective view showing a first liquid crystal film shown in FIG. 2.

Referring to FIG. 4, the cholesteric liquid crystal 112a has a plurality of rod shaped liquid crystal molecules that form a twisted shape of a predetermined pitch P.

Referring again to FIGS. 1 to 4, pitches of the first, second and third liquid crystal films 112, 114 and 116 are different from one another. A light of a wavelength that is a product of the pitch of one of the first, second and third liquid crystal films 112, 114 and 116 times a refractive index of liquid crystal film is reflected from the liquid crystal film. The first liquid crystal film 112 has a greater pitch than the second liquid crystal film 114, and the second liquid crystal film 114 has a greater pitch than the third liquid crystal film 116.

Each of the first, second and third liquid crystal films 112, 114 and 116 includes a mixture of the cholesteric liquid crystal and a vertical alignment (VA) liquid crystal, which are mixed in a predetermined ratio. The mixture ratio of the cholesteric liquid crystal and the VA liquid crystal in each of the first, second and third liquid crystal films 112, 114 and 116 may vary. In this exemplary embodiment, the first, second and third liquid crystal films 112, 114 and 116 have a mixture ratio of about 8 to about 2, a mixture ratio of about 7 to about 3, and a mixture ratio of about 6 to about 4, respectively.

Each of the first, second and third liquid crystal films 112, 114 and 116 transmits a light that vibrates in a direction different from a polarization direction of the choleristeric liquid crystal, and a polarized light that is polarized in the polarization direction of the cholesteric liquid crystal is reflected from each of the first, second and third liquid crystal films 112, 114 and 116. The reflected light that is reflected from one of the first, second and third liquid crystal films 112, 114 and 116 is one of a right circularly polarized light and a left circularly polarized light, and the transmitted light that has passed through the one of the first, second and third liquid crystal films 112, 114 and 116 has a polarization opposite that of the light that is reflected.

The second liquid crystal assembly 120 has a plurality of rod shaped liquid crystal molecules that form a twisted shape in a second direction that is opposite to the first direction. The second liquid crystal assembly 120 transmits light that is polarized in a direction that is different from the second direction, and a light that is polarized in the second direction is reflected from the second liquid crystal assembly 120.

The second liquid crystal assembly 120 includes a fourth liquid crystal film 122, a fifth liquid crystal film 124 and a sixth liquid crystal film 126. The fourth, fifth and sixth liquid crystal films 122, 124 and 126 generate a circularly polarized red light, a circularly polarized green light and a circularly polarized blue light, respectively. In this exemplary embodiment, the fifth liquid crystal film 124 is on the fourth liquid crystal film 122, and the sixth liquid crystal film 126 is on the fifth liquid crystal film 124.

A third adhesive 123 is interposed between the fourth and fifth liquid crystal films 122 and 124 so that the fifth liquid crystal film 124 is attached to the fourth liquid crystal film 122. A fourth adhesive 125 is interposed between the fifth and sixth liquid crystal films 124 and 126 so that the sixth liquid crystal film 126 is attached to the fifth liquid crystal film 124.

Each of the fourth, fifth and sixth liquid crystal films 122, 124 and 126 includes a mixture of the cholesteric liquid crystal and the VA liquid crystal that are mixed in a predetermined ratio. The mixture ratio of the cholesteric liquid crystal and the VA liquid crystal in each of the fourth, fifth and sixth liquid crystal films 122, 124 and 126 may vary depending on a wavelength of light that passes through each of the fourth, fifth and sixth liquid crystal films 122, 124 and 126.

Each of the fourth, fifth and sixth liquid crystal films 122, 124 and 126 transmits light that vibrates in a direction different from a polarization direction of the choleristeric liquid crystal, and reflects polarized light that is polarized in the polarization direction of the cholesteric liquid crystal. The reflected light that is reflected from one of the fourth, fifth and sixth liquid crystal films 122, 124 and 126 is one of a right circularly polarized light and a left circularly polarized light, and the transmitted light that has passed through the one of the fourth, fifth and sixth liquid crystal films 122, 124 and 126 has a polarization opposite that of the reflected light.

When the first liquid crystal assembly 110 transmits the right circularly polarized light, and the left circularly polarized light is reflected from the first liquid crystal assembly 110, the right circularly polarized light that has passed through the first liquid crystal assembly 110 is incident into the second liquid crystal assembly 120. The second liquid crystal assembly 120 is aligned in opposite direction to the first liquid crystal assembly 110 so that the right circularly polarized light that has passed through the first liquid crystal assembly 110 is reflected from the second liquid crystal assembly 120. Therefore, a reflectivity of the optical member 100 having the first and second liquid crystal assemblies 110 and 120 is increased.

The optical member 150 may further include an adhesive film 150 that is interposed between the first and second liquid crystal assemblies 110 and 120 so that the first liquid crystal assembly 110 is combined with the second liquid crystal assembly 120.

In this exemplary embodiment, the adhesive film 150 includes an ultraviolet curable resin. When an ultraviolet light is irradiated onto the adhesive film 150, the second liquid crystal assembly 120 is attached to the first liquid crystal assembly 110.

Figure 5:
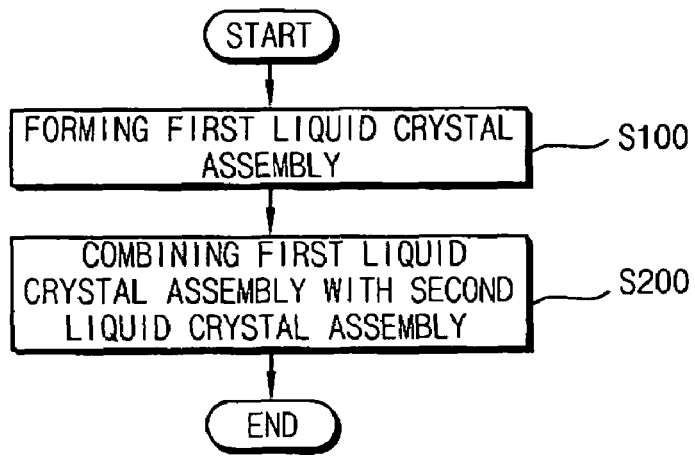
FIG. 5 is a flow chart showing a method of manufacturing the optical member shown in FIG. 1.
Figure 6A:
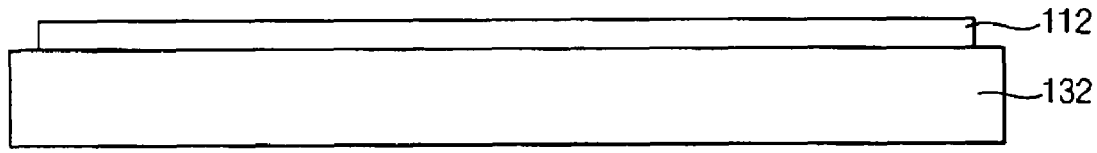
FIGS. 6A to 8 are cross-sectional views showing a method of manufacturing the first liquid crystal assembly shown in FIG. 5.
Figure 6B:
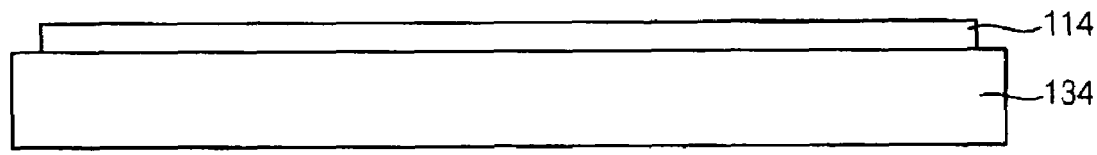
Figure 6C:
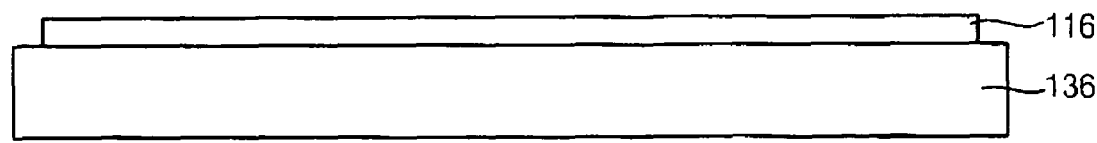

FIG. 5 is a flow chart showing a method of manufacturing the optical member shown in FIG. 1. FIGS. 6A to 8 are cross-sectional views showing a method of manufacturing the first liquid crystal assembly shown in FIG. 5.

Referring to FIGS. 5 to 8, in order to manufacture the optical member, the first liquid crystal assembly is formed (step S100). In particular, referring to FIGS. 6A to 6C, the first, second and third liquid crystal films 112, 114 and 116 are formed on a first substrate 132, a second substrate 134 and a third substrate 136, respectively. In this exemplary embodiment, liquid crystals are coated on the first, second and third substrates 132, 134 and 136 to form the first, second and third liquid crystal films 112, 114 and 116, respectively.

Figure 7:
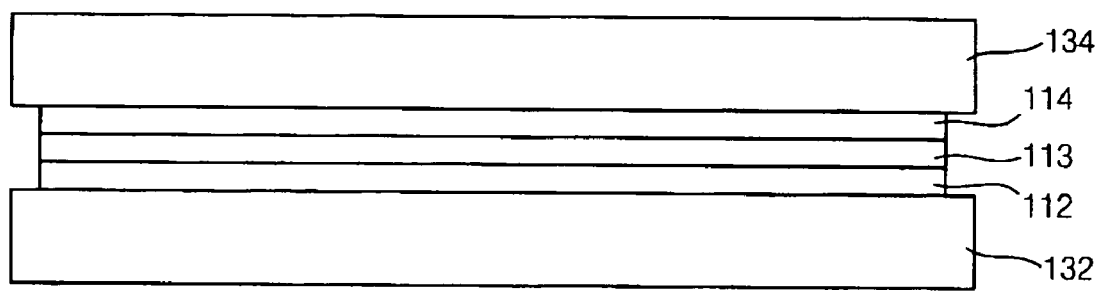

Referring to FIG. 7, the first adhesive 113 is formed on the first liquid crystal film 112, and the second liquid crystal film 114 is attached to the first adhesive 113 so that the second liquid crystal film 114 is attached to the first liquid crystal film 112.

Figure 8:
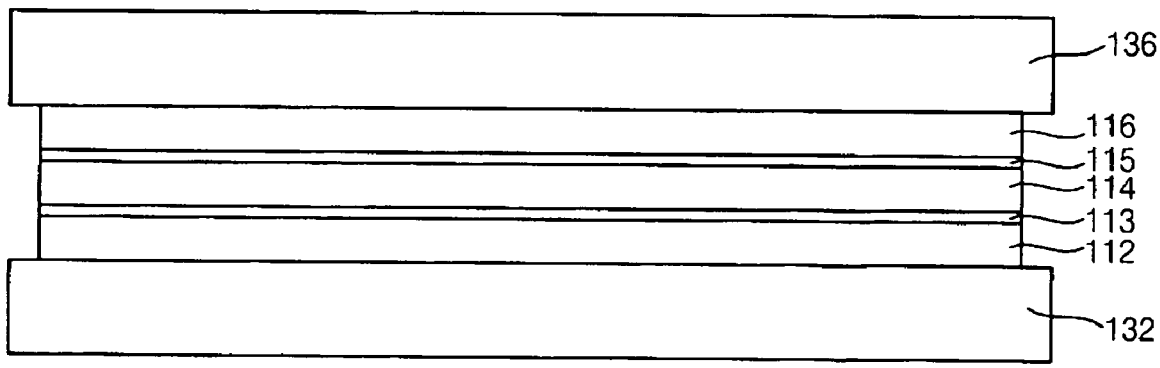

Referring to FIG. 8, the second substrate 134 is removed from the second liquid crystal film 114. The second adhesive 115 is formed on the second liquid crystal film 114, and the third liquid crystal film 116 is attached to the second adhesive 115 so that the third liquid crystal film 116 is attached to the second liquid crystal film 114. The first and third substrates 132 and 136 are detached to form the first liquid crystal assembly 110.

The second liquid crystal assembly 120 is formed through a similar method as the first liquid crystal assembly 110.

The second liquid crystal assembly 120 is combined with the first liquid crystal assembly 110 (step S200). The adhesive film 150 is interposed between the first and second liquid crystal assemblies 110 and 120.

Figure 9:
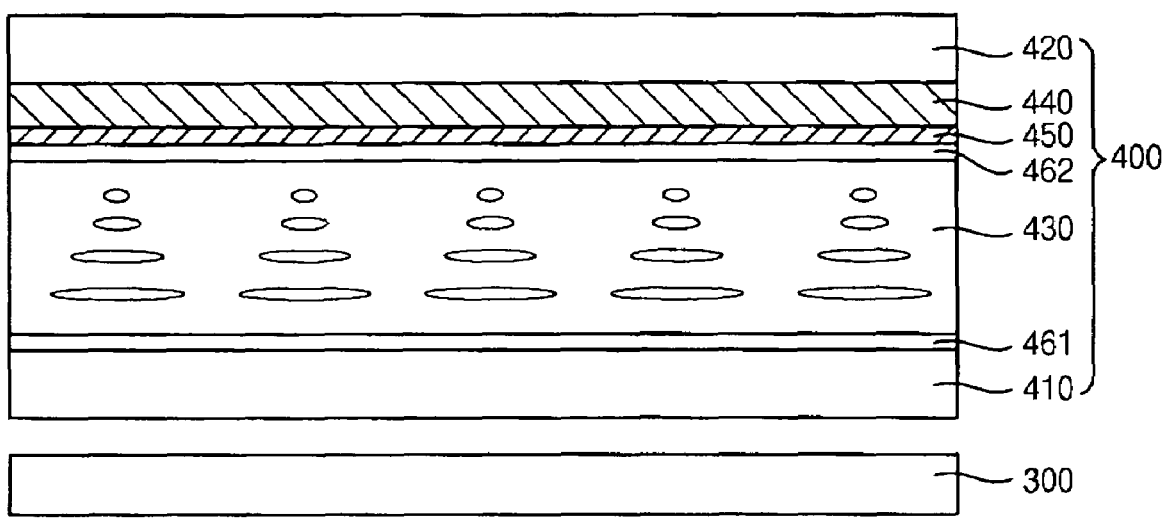
FIG. 9 is a cross-sectional view showing a display device in accordance with another exemplary embodiment of the present invention.
Figure 10:
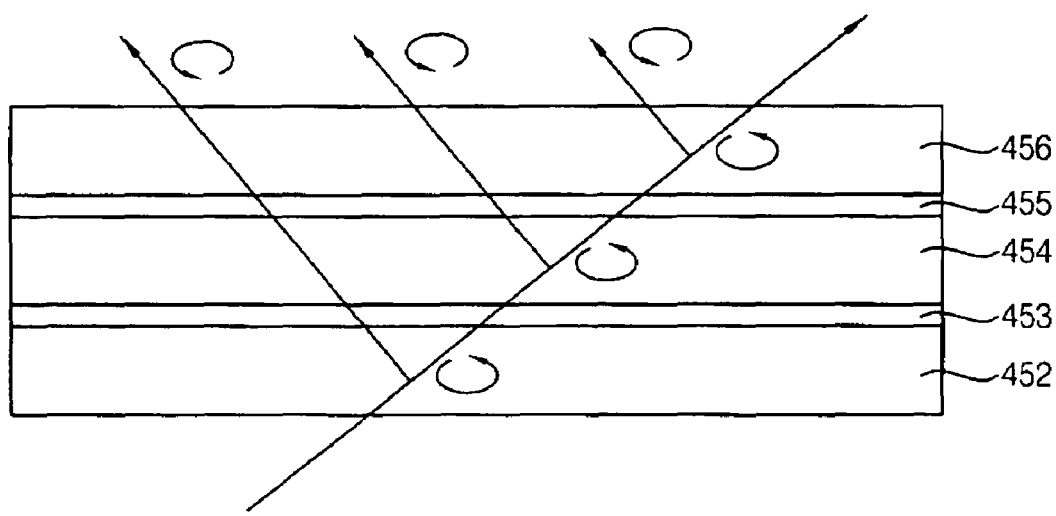
FIG. 10 is a cross-sectional view showing an optical member shown in FIG. 9.

FIG. 9 is a cross-sectional view showing a display device in accordance with another exemplary embodiment of the present invention. FIG. 10 is a cross-sectional view showing an optical member shown in FIG. 9.

Referring to FIGS. 9 and 10, the display device 200 includes a light source unit 300 and a display unit 400.

The light source unit 300 generates light. In this exemplary embodiment, the light generated by the light source unit 300 may be an ultraviolet light, a bluish light, etc. The light generated from the light source unit 300 has a wavelength of about 350 nm to about 450 nm.

The display unit 400 is provided on the light source unit 300 to display an image using the light generated by the light source unit 300.

The display unit 400 includes a liquid crystal layer 430, a fluorescent layer 440 and an optical member 450. The display unit 400 further includes a first substrate 410, a second substrate 420 corresponding to the first substrate 410. The first and second substrates 410 and 420 include a first electrode 461 and a second electrode 462, respectively. The first and second electrodes 461 and 462 control arrangement of liquid crystals in the liquid crystal layer 430.

The first substrate 410 coupled to the light source unit 300. The first substrate 410 transmits the ultraviolet light that is generated from the light source unit 300. In this exemplary embodiment, the first substrate 410 comprises low alkaline glass that has alkaline ions of no more than about 7 wt %. Alternatively, the first substrate 410 may comprise an alkaline-free glass.

The first substrate 410 may comprise a quartz substrate. The quartz substrate has alkaline ions of no more than about 2 ppm, and transmits the ultraviolet light generated from the light source unit 300.

The second substrate 420 is spaced apart from the first substrate 410 by a predetermined distance, and is aligned with the first substrate 410. In this exemplary embodiment, the second substrate 420 comprises substantially the same material as the first substrate 410.

The fluorescent layer 440 is on the second substrate 420. When the light generated from the light source unit 300 is irradiated onto the fluorescent layer 440, excitons are generated from the fluorescent layer 440, thereby generating a visible light.

The liquid crystal layer 430 is interposed between the first and second substrates 410 and 420. The arrangement of liquid crystals in the liquid crystal layer 430 are varied to control a light transmittance of the liquid crystal layer 430.

A liquid crystal controlling part includes the first electrode 461 that is on the first substrate 410 and the second electrode 462 that is on the second substrate 420. The liquid crystal controlling part forms an electric field between the first and second electrodes 461 and 462. The arrangement of liquid crystals in the liquid crystal layer 430 are varied in response to the electric field applied thereto so that the light transmittance of the liquid crystal layer 430 is changed, thereby displaying the image.

The optical member 450 is interposed between the second electrode 462 and the fluorescent layer 440. The optical member 450 reflects light of a predetermined wavelength, and transmits light having a wavelength other than the predetermined wavelength. The optical member 450 comprises a cholesteric liquid crystal. In this exemplary embodiment, the optical member 450 includes a first liquid crystal film 452, a second liquid crystal film 454 and a third liquid crystal film 456.

The first, second and third liquid crystal films 452, 454 and 456 generate a circularly polarized red light, a circularly polarized green light and a circularly polarized blue light, respectively. In this exemplary embodiment, the second liquid crystal film 454 is on the first liquid crystal film 452, and the third liquid crystal film 456 is on the second liquid crystal film 454. Therefore, substantially all of the visible light generated from the fluorescent layer 440 is reflected by the optical member 450.

A first adhesive 453 is interposed between the first and second liquid crystal films 452 and 454 so that the second liquid crystal film 454 is attached to the first liquid crystal film 452. A second adhesive 455 is interposed between the second and third liquid crystal films 454 and 456 so that the third liquid crystal film 456 is attached to the second liquid crystal film 454.

The pitches 'P' of the first, second and third liquid crystal films 452, 454 and 456 are different from one another. For each of the first, second and third liquid crystal films 452, 454 and 456, light having a wavelength that is a product of the pitch 'P' times the refractive index of the cholesteric liquid crystal of the liquid crystal film 452, 454 or 456 is reflected from the liquid crystal film 452, 454 or 456. The first liquid crystal film 452 has a greater pitch than the second liquid crystal film 454, and the second liquid crystal film 454 has a greater pitch than the third liquid crystal film 456.

Each of the first, second and third liquid crystal films 452, 454 and 456 transmits light that vibrates in a direction different from a polarization direction of the choleristeric liquid crystal, and polarized light that is polarized in the polarization direction of the cholesteric liquid crystal is reflected from each of the first, second and third liquid crystal films 452, 454 and 456. The reflected light that is reflected from one of the first, second and third liquid crystal films 452, 454 and 456 is either a right circularly polarized light or a left circularly polarized light, and the transmitted light that has passed through the one of the first, second and third liquid crystal films 452, 454 and 456 is circularly polarized in the opposite direction.

In particular, the liquid crystal layer 430 transmits the light generated from the light source unit 300, and the optical member 450 transmits the ultraviolet light of the light that has passed through the liquid crystal layer 430. The visible light that has a wavelength corresponding to red, green or blue light is reflected from the optical member 450 so that the reflected visible light is irradiated onto the liquid crystal layer 430.

When the ultraviolet light that has passed through the optical member 450 is irradiated onto the fluorescent layer 440, the red, green and blue lights are generated. In addition, the red, green and blue lights that are reflected from the optical member 450 are irradiated again onto the liquid crystal layer 430 so that the reflected light is recycled. That is, the reflected light functions as the recycled light. Therefore, a luminance of the display device is increased by the red, green and blue lights generated from the fluorescent layer 440 and the recycled light.

In another embodiment, the light source unit 300 generates a bluish light. In this embodiment, the optical member 450 may be configured to transmit light having a wavelength corresponding to, while the red and green wavelength light generated by the light source unit 300 are reflected from the optical member 450. Alternatively, the light source unit 300 may generate a mixture of bluish light and ultraviolet light. In this case, the optical member 450 may be configured to transmit light having a wavelength corresponding to both blue and ultraviolet light, while reflecting red and green wavelength light. This reflected red and green wavelength light is irradiated back onto the liquid crystal layer 430.

Therefore, the luminance of the display device is increased.

Furthermore, when the light source unit 300 generates the bluish light, the fluorescent layer 440 includes a red fluorescent portion and a green fluorescent portion. Accordingly, a blue fluorescent portion may be omitted.

Figure 11:
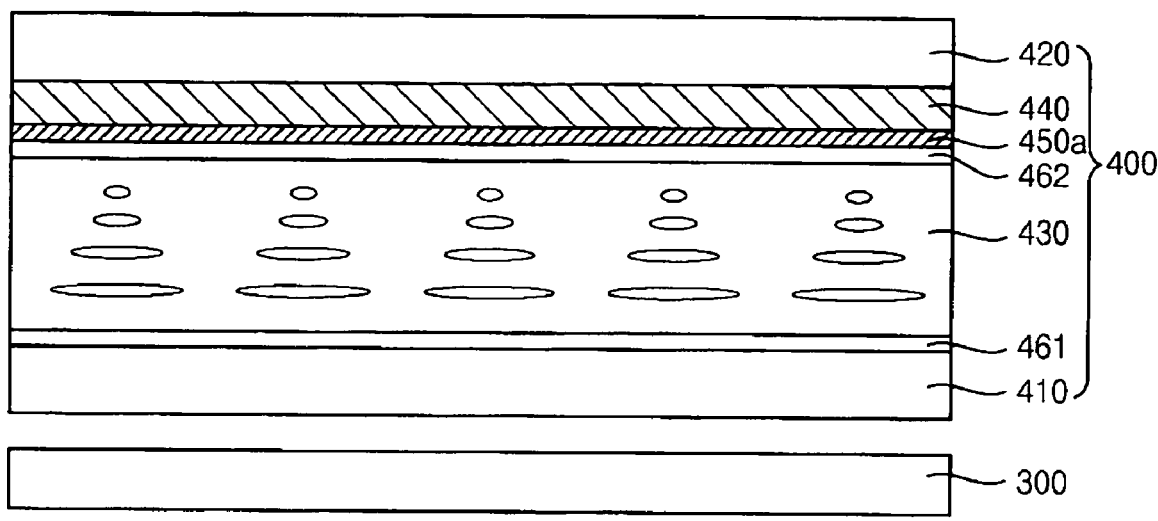
FIG. 11 is a cross-sectional view showing a display device in accordance with another exemplary embodiment of the present invention.
Figure 12:
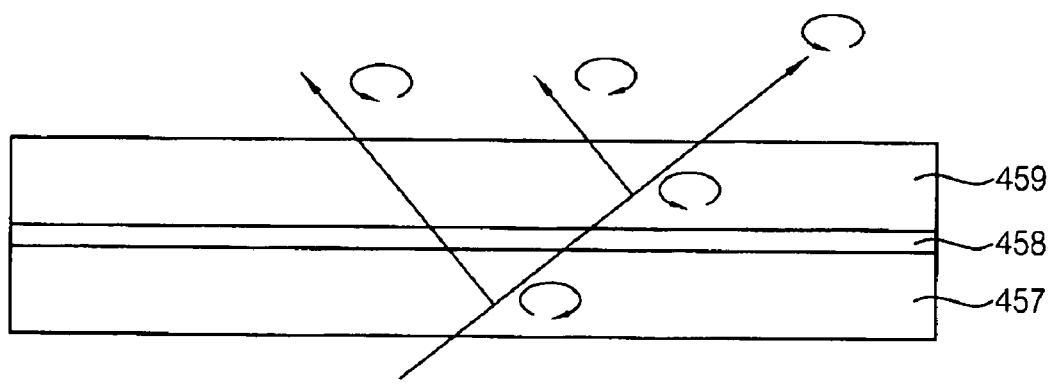
FIG. 12 is a cross-sectional view showing an optical member shown in FIG. 11.

FIG. 11 is a cross-sectional view showing a display device in accordance with another exemplary embodiment of the present invention. FIG. 12 is a cross-sectional view showing an optical member shown in FIG. 11. The display device of FIGS. 11 and 12 is substantially the same as in FIGS. 9 and 10, except for the optical member. Thus, the same reference numerals will be used to refer to the same or like parts as those described in FIGS. 9 and 10 and any further explanation concerning the above elements will be omitted.

Referring to FIGS. 11 and 12, the optical member 450a includes a first liquid crystal assembly 457 and a second liquid crystal assembly 459.

The first liquid crystal assembly 457 comprises a cholesteric liquid crystal that is aligned in a first direction. The first liquid crystal assembly 457 transmits light that vibrates in a direction different from the first direction, and reflects light that is polarized in the first direction.

The second liquid crystal assembly 459 is on the first liquid crystal assembly 457. The second liquid crystal assembly 459 includes a cholesteric liquid crystal that is aligned in a second direction opposite to the first direction. The second liquid crystal assembly 459 transmits light that vibrates in a direction different from the second direction, and reflects light that is polarized in the second direction.

An adhesive film 458 is interposed between the first and second liquid crystal assemblies 457 and 459 so that the second liquid crystal assembly 459 is attached to the first liquid crystal assembly 457.

When the first liquid crystal assembly 457 transmits a right circularly polarized light, and a left circularly polarized light is reflected from the first liquid crystal assembly 457. The right circularly polarized light that has passed through the first liquid crystal assembly 457 is incident into the second liquid crystal layer 459. The second liquid crystal assembly 459 is aligned in a direction orthogonal to the first liquid crystal assembly 457 so that the right circularly polarized light that has passed through the first liquid crystal layer 457 is reflected from the second liquid crystal assembly 459. Therefore, a reflectivity of the optical member 450 having the first and second liquid crystal assemblies 457 and 459 is increased.

In embodiments in which the light source unit 300 generates a bluish light, the optical member 450 may be configured to transmit blue light, while reflecting the red and green light. Alternatively, the light source unit 300 may generate a mixture of the bluish light and ultraviolet light.

In particular, the blue light that has passed through the liquid crystal layer 430 is irradiated onto the optical member 450. In this exemplary embodiment, the optical member 450 transmits the blue and ultraviolet wavelength light of the bluish light, and reflects the red and green wavelength light of the bluish light, causing the reflected red and green light to be irradiated onto the liquid crystal layer 430.

The blue light and the ultraviolet light that have passed through the optical member 450 are irradiated onto the fluorescent layer 440, and red and green light are generated from the fluorescent layer 440 based on the blue light and the ultraviolet light. In addition, the red and green wavelength light of the bluish light that are generated by the light source unit 300 are reflected from the optical member 450 and irradiated onto the liquid crystal layer 430 so that the red light and the green light of the bluish light are recycled. Therefore, the luminance of the display device is increased by the red and green lights generated from the fluorescent layer 440, the blue light that has passed through the optical member 450, and the recycled light.

Furthermore, when the light source unit 300 generates the blue light, the fluorescent layer 440 includes a red fluorescent portion and a green fluorescent portion. Accordingly, a blue fluorescent portion may be omitted.

Figure 13:
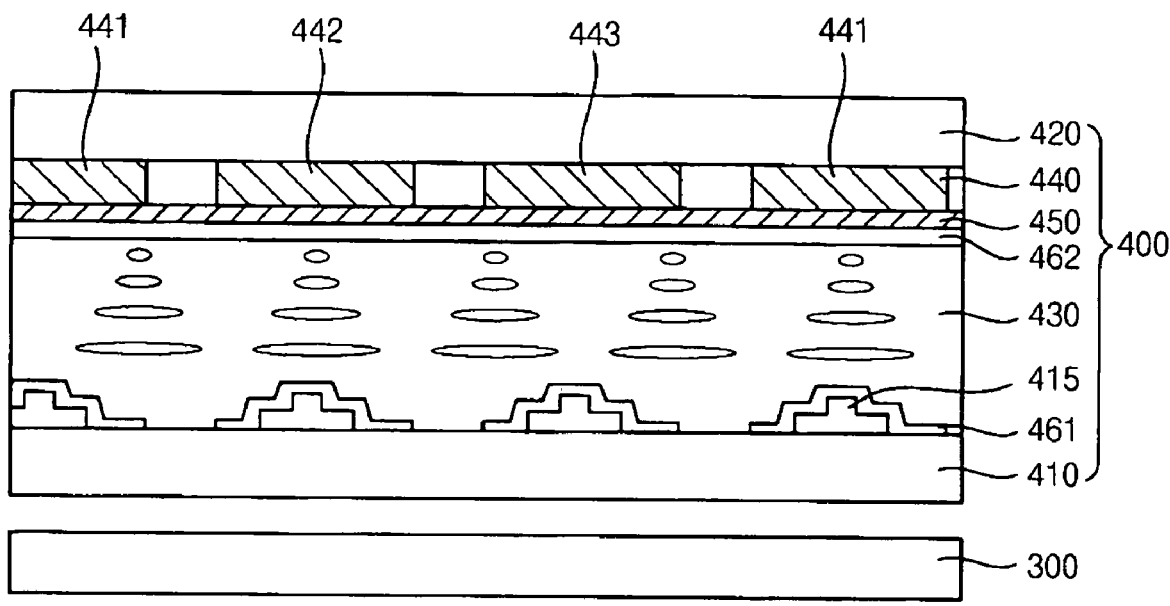
FIG. 13 is a cross-sectional view showing a display device in accordance with another exemplary embodiment of the present invention.

FIG. 13 is a cross-sectional view showing a display device in accordance with another exemplary embodiment of the present invention. The display device of FIG. 13 is substantially the same as in FIGS. 9 and 10, except for a switching element and a fluorescent layer. Thus, the same reference numerals will be used to refer to the same or like parts as those described in FIGS. 9 and 10 and any further explanation concerning the above elements will be omitted.

Referring to FIG. 13, the fluorescent layer 440 includes a first fluorescent portion 441 that generates red light, a second fluorescent portion 442 that generates green light, and a third fluorescent portion 443 that generates blue light. In this exemplary embodiment, the first, second and third fluorescent portions 441, 442 and 443 are arranged in a matrix shape on a second substrate 420.

The fluorescent layer 440 may comprise an organic fluorescent material or an inorganic fluorescent material. When the fluorescent layer 440 comprises an inorganic fluorescent material, the first fluorescent portion 441 may include $Y_2O_2S:Eu$, and the second fluorescent portion 442 may include $(Sr, Ca, Ba, Eu)10(PO_4)_6 \cdot Cl_2$. In addition, the third fluorescent portion 443 may include 3(Ba, Mg, Eu, Mn)O.8Al$_2$O$_3$, respectively. When the fluorescent layer 440 comprises an organic fluorescent material, the first and second fluorescent portions 441 and 442 may comprise rhodamine B and brilliant sulfoflavine FF, respectively.

The fluorescent layer 440 is formed in a region defined by a black matrix (not shown). The black matrix (not shown) separates the first, second and third fluorescent portions 441, 442 and 443, and blocks light that is irradiated onto the regions between the first, second and third fluorescent portions 441, 442 and 443 where the liquid crystals are not controllable, thereby improving an image display quality.

The switching element 415 is on a first substrate 410. Alternatively, a plurality of switching elements 415 may be on the first substrate 410. Each of the switching elements 415 corresponds to each of the first, second and third fluorescent portions 441, 442 and 443.

Each of the switching elements 415 is electrically connected to a first electrode 461 so that a voltage applied to the first electrode 415 may be applied to the switching element 415. The switching element 415 may comprise a metal insulator metal (MIM) element, a thin film transistor (TFT), etc.

In particular, light generated from the light source unit 300 passes through the liquid crystal layer 430. The optical member 450 transmits ultraviolet wavelength light of the light that has passed through the liquid crystal layer 430. The visible wavelength light of the light that has passed through the liquid crystal layer 430 is reflected from the optical member 450, and the reflected light is irradiated back onto the liquid crystal layer 430.

When the ultraviolet light that has passed through the optical member 450 is irradiated onto a first fluorescent portion 441, a second fluorescent portion 442 and a third fluorescent portion 443, red light, green light and blue light are generated. In addition, the visible light of the light that is reflected from the optical member 450 is irradiated onto the liquid crystal layer 430. That is, the image is displayed using the visible light of the light generated from the light source unit 300, which is recycled so that the recycled light and the red, green and blue lights that are generated from the fluorescent layer 440. That is, the image displayed using the recycled light and the red, green and blue lights generated from the fluorescent layer 440 has greater luminance than an image displayed using only the red, green and blue lights generated from the fluorescent layer 440. Accordingly, the luminance of the display device is increased.

When the light source unit 300 generates a bluish light, the optical member 450 may be configured to transmit the blue light, while reflecting the red and green lights. Alternatively, the light source unit 300 may generate a mixture of the bluish light and an ultraviolet light.

In particular, the blue light that has passed through the liquid crystal layer 430 is irradiated onto the optical member 450. In this exemplary embodiment, the optical member 450 transmits the blue and ultraviolet wavelength light of the bluish light, and reflects the red and green wavelength light of the bluish light, causing the reflected red and green light to be irradiated onto the liquid crystal layer 430.

The blue light and the ultraviolet light that have passed through the optical member 450 are irradiated onto the fluorescent layer 440, and a red light and a green light are generated from the fluorescent layer 440 based on the blue light and the ultraviolet light. In addition, the red light and the green light of the bluish light that are generated by the light source 300 are reflected from the optical member 450 and irradiated onto the liquid crystal layer 430 so that the red light and the green light of the bluish light are recycled. Therefore, the luminance of the display device is increased by the red and green lights generated from the fluorescent layer 440, the blue light that has passed through the optical member 450, and the recycled light.

Figure 14:
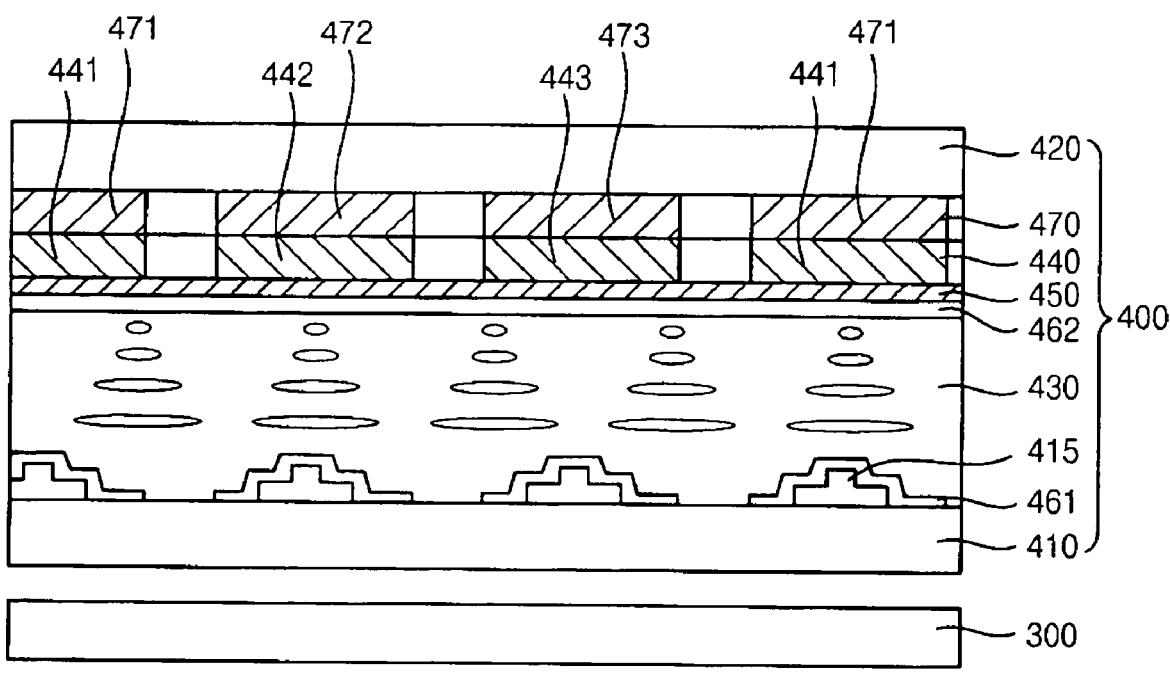
FIG. 14 is a cross-sectional view showing a display device in accordance with another exemplary embodiment of the present invention.

FIG. 14 is a cross-sectional view showing a display device in accordance with another exemplary embodiment of the present invention. The display device of FIG. 14 is substantially the same as in FIGS. 9 and 10, except for the color filter layer. Thus, the same reference numerals will be used to refer to the same or like parts as those described in FIGS. 9 and 10 and any further explanation concerning the above elements will be omitted.

Referring to FIG. 14, a color filter layer 470 is interposed between a fluorescent layer 440 and a second substrate 420. The color filter layer 470 blocks ultraviolet light from outside the display device and also blocks ultraviolet light generated by the light source unit 300 which leaks through the fluorescent layer 440.

The color filter layer 470 includes a first color filter portion 471, a second color filter portion 472 and a third color filter portion 473. The first, second and third color filter portions 471, 472 and 473 transmit red light, green light and blue light, respectively.

The first, second and third color filter portions 471, 472 and 473 correspond to the first, second and third fluorescent portions 441, 442 and 443, respectively. A contrast ratio of the red, green and blue light produced by the display device is increased by the first, second and third fluorescent portions 441, 442 and 443.

In embodiments in which the light source unit 300 generates a bluish light, the optical member 450 may be configured to transmit blue wavelength light of the bluish light, while reflecting the red and green wavelength light of the bluish light. Alternatively, the light source unit 300 may generate a mixture of the bluish light and ultraviolet light. In this exemplary embodiment, the blue color filter portion is omitted.

In particular, the blue light that has passed through the liquid crystal layer 430 is irradiated onto the optical member 450. In this exemplary embodiment, the optical member 450 transmits the blue and ultraviolet wavelength light of the bluish light, and reflects the red and green wavelength light of the bluish light, causing the reflected red and green lights to be irradiated onto the liquid crystal layer 430.

The blue light and the ultraviolet light that have passed through the optical member 450 are irradiated onto the fluorescent layer 440, and red and green light are generated from the first and second fluorescent portions 441 and 442 of the fluorescent layer 440 based on the blue light and the ultraviolet light. The third fluorescent portion 443 may be omitted. In addition, the red and green wavelength light of the bluish light that are generated by the light source unit 300 are reflected from the optical member 450 and irradiated onto the liquid crystal layer 430 so that the red light and the green light of the bluish light are recycled. Therefore, the luminance of the display device is increased by the red and green lights generated from the fluorescent layer 440, the blue light that has passed through the optical member 450, and the recycled light.

Figure 15:
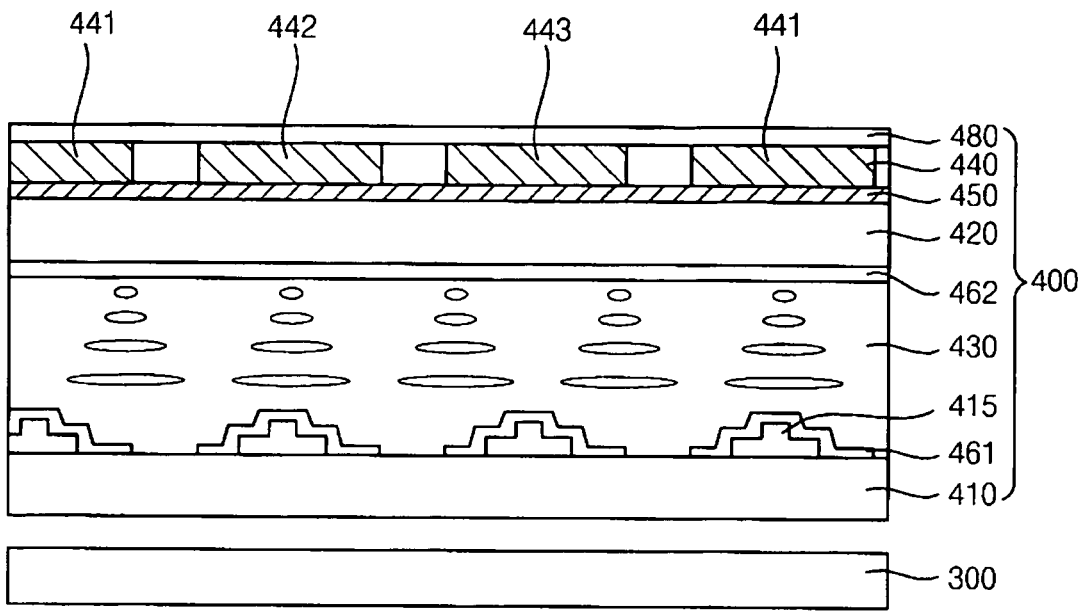
FIG. 15 is a cross-sectional view showing a display device in accordance with another exemplary embodiment of the present invention.

FIG. 15 is a cross-sectional view showing a display device in accordance with another exemplary embodiment of the present invention. The display device of FIG. 15 is substantially the same as in FIG. 13, except, for the optical member and fluorescent layer. Thus, the same reference numerals will be used to refer to the same or like parts as those described in FIG. 13 and any further explanation concerning the above elements will be omitted.

Referring to FIG. 15, the second substrate 420 includes a first surface and a second surface corresponding to the first surface. The first surface of the second substrate 420 faces the liquid crystal layer 430 and the second surface is opposite the first surface.

The optical member 450 is provided on the second surface of the second substrate 420, and the fluorescent layer 440 is provided on the optical member 450. The fluorescent layer 440 includes a first fluorescent portion 441, a second fluorescent portion 442 and a third fluorescent portion 443.

The display device 200 may further include a protecting layer 480 on the fluorescent layer 440 to protect the fluorescent layer 440.

In embodiments in which the light source unit 300 generates a bluish light, the optical member 450 may be configured to reflect red and green wavelength light. In addition, the third fluorescent portion 443 and a blue color filter portion may be omitted.

Figure 16:
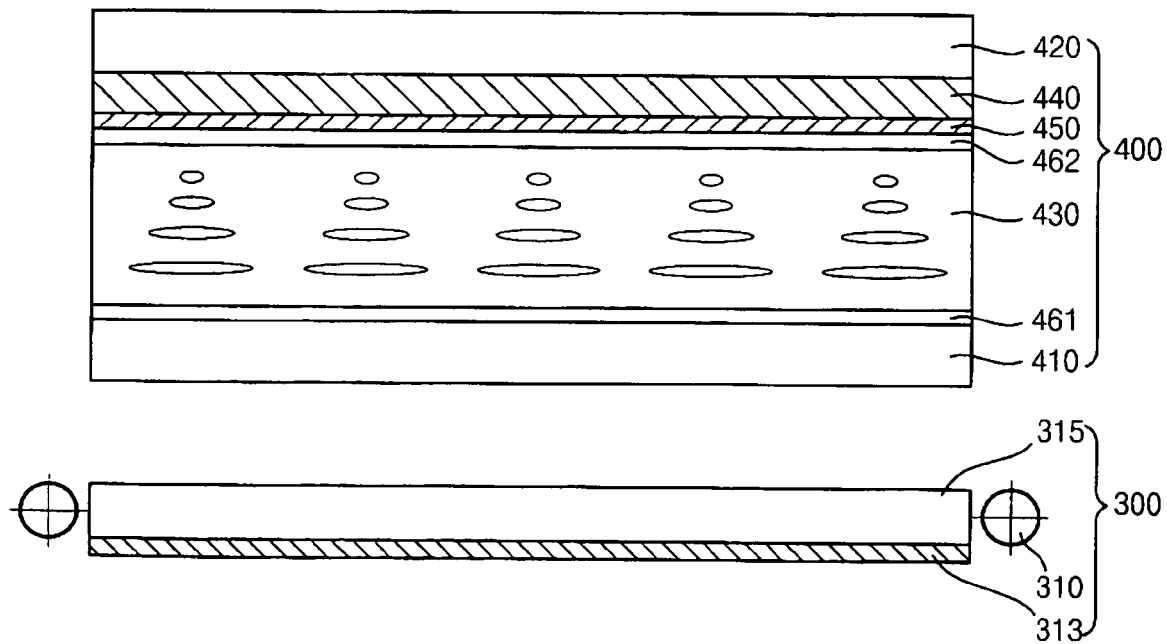
FIG. 16 is a cross-sectional view showing a display device in accordance with another exemplary embodiment of the present invention.

FIG. 16 is a cross-sectional view showing a display device in accordance with another exemplary embodiment of the present invention. The display device of FIG. 16 is substantially the same as in FIGS. 9 and 10, except for the light source unit. Thus, the same reference numerals will be used to refer to the same or like parts as those described in FIGS. 9 and 10 and any further explanation concerning the above elements will be omitted.

Referring to FIG. 16, the light source unit 300 includes a light emitting diode 310, a reflecting plate 313 and a light guiding plate 315.

The light guiding plate 315 is positioned under a first substrate 410 to guide light generated by the light emitting diode 310.

The light emitting diode 310 is positioned adjacent to a side of the light guiding plate 315 to generate blue wavelength light. A lamp reflector (not shown) may surround the light emitting diode 310 so that the blue light generated from the light emitting diode 310 is reflected from the lamp reflector (not shown) toward the light guiding plate 315.

The light emitting diode 310 may be powered by a direct current so that an inverter is unnecessary. The light source unit 300 having the light emitting diode 310 has lower power consumption than a light source unit having an inverter.

The reflecting plate 313 is positioned under the light guiding plate 315 so that light leaking from the light guiding plate 315 is reflected by the reflecting plate 313 toward the display unit 400, thereby increasing a luminance of the display device.

An optical sheet (not shown) may be interposed between the light guiding plate 315 and the first substrate 410. The optical sheet (not shown) may include a diffusion sheet that diffuses the light to improve the uniformity of the light across the surface of the display unit 400, and a brightness enhancement sheet that increases a luminance when viewed in a plan view of the display device.

Figure 17:
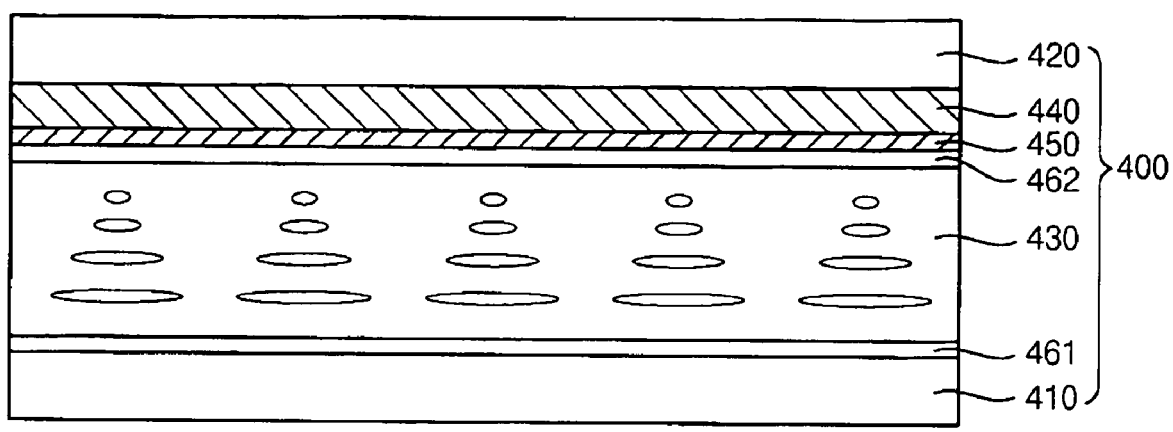
FIG. 17 is a cross-sectional view showing a display device in accordance with another exemplary embodiment of the present invention.
Figure 17:
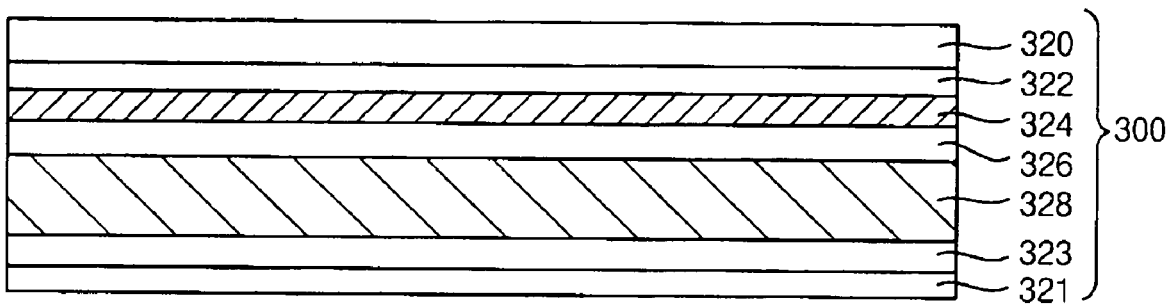

FIG. 17 is a cross-sectional view showing a display device in accordance with another exemplary embodiment of the present invention. The display device of FIG. 17 is substantially the same as in FIGS. 9 and 10, except for the light source unit. Thus, the same reference numerals will be used to refer to the same or like parts as those described in FIGS. 9 and 10 and any further explanation concerning the above elements will be omitted.

Referring to FIG. 17, the light source unit 300 includes a base substrate 320, a transparent electrode 322, a positive charge carrier injecting layer 324, a positive charge carrier transporting layer 326, a light emitting layer 328, a negative charge carrier transporting layer 323 and a metal electrode 321.

Electrons from the metal electrode 321 are combined with holes from the transparent electrode 322 in the light emitting layer 328 to form excitons in the light emitting layer 328, thereby generating light.

In accordance with the present invention, the optical member includes the liquid crystal assembly that has the cholesteric liquid crystals arranged in opposite directions to each other so that the reflectivity of the optical member is increased.

In addition, the visible light leaking from the fluorescent layer is reflected from the optical member to increase the luminance and the resolution, thereby improving the image display quality.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A display device comprising:
   a light source unit for generating light; and
   a display unit, comprising:
      a liquid crystal layer that varies a light transmittance of the light generated from the light source unit;
      a fluorescent layer that generates visible light based on light from the light source unit; and
      an optical member comprising a cholesteric liquid crystal for transmitting light that has passed through the liquid crystal layer onto the fluorescent layer,
      wherein the optical member reflects a light that leaks from the fluorescent layer.

2. The display device of claim 1, wherein the optical member is interposed between the liquid crystal layer and the fluorescent layer.

3. The display device of claim 1, wherein the display unit further comprises:
   a first substrate;
   a second substrate combined with the first substrate so that the liquid crystal layer is interposed between the first and second substrates; and
   a liquid crystal control part including a first electrode and a second electrode formed on at least one of the first substrate and the second substrate.

4. The display device of claim 3, wherein the optical member is positioned on the second substrate, and the fluorescent layer is positioned on the optical member.

5. The display device of claim 1, wherein the optical member comprises:
   a first liquid crystal assembly twisted in a first direction such that light polarized in the first direction is reflected from the first liquid crystal assembly; and
   a second liquid crystal assembly disposed on the first liquid crystal assembly, and twisted in a second direction opposite to the first direction such that light polarized in the second direction is reflected from the second liquid crystal assembly.

6. The display device of claim 5, wherein each of the first and second liquid crystal assemblies comprises a first liquid crystal film that generates a right circularly polarized red light, a second liquid crystal film that generates a right circularly polarized green light, and a third liquid crystal film that generates a right circularly polarized blue light.

7. The display device of claim 6, wherein the second liquid crystal film is positioned on the first liquid crystal film, and the third liquid crystal film is positioned on the second liquid crystal film.

8. The display device of claim 7, wherein the first liquid crystal film has a greater pitch than the second liquid crystal film, and the second liquid crystal film has a greater pitch than the third liquid crystal film.

9. The display device of claim 8, wherein a ratio of the choleseric LC material and the VA material in the respective first, second and third liquid crystal films has a range of 8 to 2, 7 to 3 and 6 to 4, respectively.

10. The display device of claim 6, wherein the first, second and third liquid crystal films each further comprises VA (vertical alignment) liquid crystal material.

11. The display device of claim 5, wherein each of the first and second liquid crystal assemblies comprises a pitch corresponding to a wavelength of a visible light.

12. The display device of claim 5, wherein the optical member further comprises an adhesive film interposed between the first and second liquid crystal assemblies so that the second liquid crystal assembly is attached to the first liquid crystal assembly.

13. The display device of claim 1, wherein the light source unit comprises a light emitting diode.

14. The display device of claim 1, wherein the light source unit comprises an organic light emitting element.

15. The display device of claim 1, wherein the display unit further comprises a color filter that transmits the visible light produced by the display device and blocks light generated external to the display device.

16. The display device of claim 1, wherein the optical member comprises:
   a first liquid crystal assembly twisted in a first direction such that light polarized in the first direction is reflected from the first liquid crystal assembly; and
   a second liquid crystal assembly on the first liquid crystal assembly, and twisted in a second direction opposite to the first direction such that light polarized in the second direction is reflected from the second liquid crystal assembly.

17. The display device of claim 16, wherein each of the first and second liquid crystal assemblies comprises a first liquid crystal film that generates a right circularly polarized red light, a second liquid crystal film that generates a right circularly polarized green light, and a third liquid crystal film that generates a right circularly polarized blue light.

18. The display device of claim 17, wherein the second liquid crystal film is positioned on the first liquid crystal film, and the third liquid crystal film is positioned on the second liquid crystal film.

19. The display device of claim 16, wherein each of the first and second liquid crystal assemblies has a pitch corresponding to a wavelength of a visible light.

20. The display device of claim 16, wherein the optical member further comprises an adhesive film interposed between the first and second liquid crystal assemblies so that the second liquid crystal assembly is attached to the first liquid crystal assembly.

21. The display device of claim 1, wherein the fluorescent layer comprises an inorganic fluorescent material composed of at least one of:

$Y_2O_2S:Eu$, $(Sr, Ca, Ba, Eu)_{10}(PO_4)_6.Cl_2$, and $3(Ba, Mg, Eu, Mn)O_8Al_2O_3$.

22. The display device of claim 1, wherein the fluorescent layer comprises an organic fluorescent material composed of at least one of rhodamine B and brilliant sulfoflavine FF.

* * * * *